(12) United States Patent
Sato et al.

(10) Patent No.: US 9,201,471 B2
(45) Date of Patent: Dec. 1, 2015

(54) MOBILE ELECTRONIC DEVICE AND DISPLAY CONTROL METHOD

(75) Inventors: Takayuki Sato, Yokohama (JP);
Takahiro Nagaya, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 141 days.

(21) Appl. No.: 13/430,142

(22) Filed: Mar. 26, 2012

(65) Prior Publication Data

US 2012/0249541 A1  Oct. 4, 2012

(30) Foreign Application Priority Data

Mar. 28, 2011  (JP) ................................. 2011-069335

(51) Int. Cl.
*G06T 19/00* (2011.01)
*G06F 1/16* (2006.01)
*G06F 3/0482* (2013.01)
*H04M 1/725* (2006.01)

(52) U.S. Cl.
CPC ............ *G06F 1/1694* (2013.01); *G06F 3/0482* (2013.01); *H04M 1/72544* (2013.01)

(58) Field of Classification Search
USPC .................................................. 345/419, 427
See application file for complete search history.

(56) References Cited

U.S. PATENT DOCUMENTS

| | | | |
|---|---|---|---|
| 6,327,514 B1 * | 12/2001 | Hazama et al. | 700/145 |
| 6,577,330 B1 * | 6/2003 | Tsuda et al. | 715/782 |
| 8,531,452 B2 * | 9/2013 | Inoue et al. | 345/419 |
| 8,700,740 B2 | 4/2014 | Tanaka | |
| 2006/0031876 A1 | 2/2006 | Ok et al. | |
| 2008/0225039 A1 * | 9/2008 | Oshita et al. | 345/418 |
| 2008/0316597 A1 * | 12/2008 | Tsai et al. | 359/465 |
| 2010/0262676 A1 | 10/2010 | Tanaka | |
| 2010/0263946 A1 * | 10/2010 | Miyazaki | 178/2 R |
| 2011/0119629 A1 | 5/2011 | Huotari et al. | |
| 2011/0246877 A1 * | 10/2011 | Kwak et al. | 715/702 |
| 2012/0056830 A1 * | 3/2012 | Suzuki et al. | 345/173 |
| 2012/0081356 A1 * | 4/2012 | Filippov et al. | 345/419 |

FOREIGN PATENT DOCUMENTS

| | | |
|---|---|---|
| JP | 2003-511786 | 3/2003 |
| JP | 2009-510643 | 3/2009 |
| JP | 2009-207589 A | 9/2009 |
| JP | 2010-262469 | 11/2010 |
| JP | 2012058901 A | 3/2012 |

(Continued)

OTHER PUBLICATIONS

Translation: Suzuki, JP-2010-199835.*

(Continued)

*Primary Examiner* — Kimbinh T Nguyen
(74) *Attorney, Agent, or Firm* — Hauptman Ham, LLP

(57) ABSTRACT

A cellular telephone device with a control unit sets a display mode of a display unit to any one of a first display mode for performing two-dimensional display, and a second display mode for performing three-dimensional display; the cellular telephone device displays both of first information and second information, which is subordinate information to the first information, on the display unit, in a case of being set to the second display mode; and the cellular telephone device displays any one of the first information and the second information on the display unit, in a case of being set to the first display mode.

15 Claims, 6 Drawing Sheets

(56) References Cited

FOREIGN PATENT DOCUMENTS

| WO | 01/27735 A1 | 4/2001 |
| WO | WO2009081582 A1 | 7/2009 |

OTHER PUBLICATIONS

Notice of Reasons for Rejection for corresponding Japanese Patent Application No. 2011-069335, pp. 1-2 (Sep. 30, 2014).

Notice of Reasons for Rejection issued to JP Application No. 2015-005408, mailed Mar. 10, 2015.

Notice of Reasons for Rejection issued to JP Application No. 2015-005409, mailed Mar. 10, 2015.

Notice of Reasons for Rejection issued to JP Application No. 2015-005410, mailed Mar. 10, 2015.

Notice of Reasons for Rejection issued to JP Application No. 2015-005411, mailed Mar. 10, 2015.

\* cited by examiner

MOBILE ELECTRONIC DEVICE AND DISPLAY CONTROL METHOD

This application is based on and claims the benefit of priority from Japanese Patent Application No. 2011-069335, filed on 28 Mar. 2011, the content of which is incorporated herein by reference.

BACKGROUND OF THE INVENTION

1. Field of the Invention

The present invention relates to an electronic device including a touch panel, a display control method, and a display control program.

2. Related Art

Conventionally, in order to improve the operability, a touch panel has been provided to electronic devices. For example, Japanese Unexamined Patent Application, Publication No. 2009-207589 discloses an electronic device that can display soft keys capable of assigning functions to and displaying the functions on touch panel areas along a monitor frame.

SUMMARY OF THE INVENTION

However, in the electronic device disclosed in Japanese Unexamined Patent Application, Publication No. 2009-207589, when the number of functions is increased, it is difficult to display information such as soft keys. Moreover, when only the soft keys are displayed, it is difficult to recognize what functions are provided to the soft keys.

An object of the present invention is to provide an electronic device, a display control method and a display control program, all of which can efficiently display information in a display area.

An electronic device according to the present invention includes: a display unit; a mode setting unit that sets a display mode of the display unit to any one of: a first display mode for performing two-dimensional display; and a second display mode for performing three-dimensional display; and a control unit, and in a case of being set to the second display mode, the control unit causes the display unit to display both of first information and second information, which is subordinate information to the first information, and in a case of being set to the first display mode, the control unit causes the display unit to display any one of the first information and the second information.

Moreover, in the electronic device according to the present invention, in a case of being set to the second display mode, it is preferable for the control unit to cause the display unit to display the second information correspondingly to the first information.

In addition, in the electronic device according to the present invention, in a case of being set to the second display mode, it is preferable for the control unit to cause display unit to display the first information and the second information, at least one of which is displayed obliquely to another.

Furthermore, in the electronic device according to the present invention, in a case of being set to the second display mode, it is preferable for the control unit to cause display unit to display a virtual polyhedron composed of virtual faces in a three-dimensional manner, cause the display unit to display the first information on a first virtual face of the virtual polyhedron, and cause the display unit to display the second information on a second virtual face adjacent to the first virtual face.

Moreover, in the electronic device according to the present invention, in a case of being set to the first display mode, it is preferable for the control unit to cause the display unit to display any one of the first virtual face or the second virtual face in a two-dimensional manner.

In addition, it is preferable for the electronic device according to the present invention to further include a body including the display unit; and an inclination detecting unit that detects inclination of the body, and it is preferable for the mode setting unit to set the display mode to any one of the first display mode and the second display mode, in accordance with the inclination of the body detected by the inclination detecting unit.

Furthermore, in the electronic device according to the present invention, in a case of being set to the second display mode, it is preferable for the control unit to change a manner of displaying the second information relative to the first information displayed on the display unit, in accordance with the inclination of the body detected by the inclination detecting unit.

Moreover, in the electronic device according to the present invention, it is preferable for the control unit to cause the display unit to display a third virtual face and a fourth virtual face, the third virtual face displaying the first information, the fourth virtual face being partly or entirely overlapped with the third virtual face; in a case of being set to the first display mode, it is preferable for the control unit to cause the display unit to display the third virtual face, and restrict the fourth virtual face from being displayed, by entirely overlapping the third virtual face with the fourth virtual face; and in a case of being set to the second display mode, it is preferable for the control unit to cause the display unit to display the third virtual face and the fourth virtual face, which is partly overlapped with the third virtual face, in an oblique perspective manner in a same orientation.

In addition, in the electronic device according to the present invention, in a case of being set to the first display mode, it is preferable for the control unit to cause the display unit to display a plurality of pieces of the first information, and in a case of being set to the second display mode, it is preferable for the control unit to cause the display unit to display a plurality of pieces of the second information corresponding to the plurality of pieces of the first information, respectively, so as to correspond to the first information.

Furthermore, a display control method according to the present invention is a display control method for an electronic device including a display unit to display information on the display unit, in which the electronic device can set a display mode of the display unit to any one of: a first display mode for performing two-dimensional display; and a second display mode for performing three-dimensional display; and the display control method includes the steps of: displaying both of first information and second information, which is subordinate information to the first information, on the display unit, in a case of being set to the second display mode; and displaying any one of the first information and the second information on the display unit, in a case of being set to the first display mode.

Moreover, a display control program according to the present invention is a display control program for causing an electronic device including a display unit to execute processing for displaying information on the display unit, the display control program causes the electronic device to execute processing of: setting a display mode of the display unit to any one of: a first display mode for performing two-dimensional display; and a second display mode for performing three-dimensional display; and displaying both of first information and second information, which is subordinate information to the first information, on the display unit, in a case in which the electronic device is set to the second display mode, and displaying any one of the first information and the second information on the display unit, in a case in which the electronic device is set to the first display mode.

According to the present invention, information can be efficiently displayed in a display area.

DETAILED DESCRIPTION OF THE INVENTION

Figure 1:
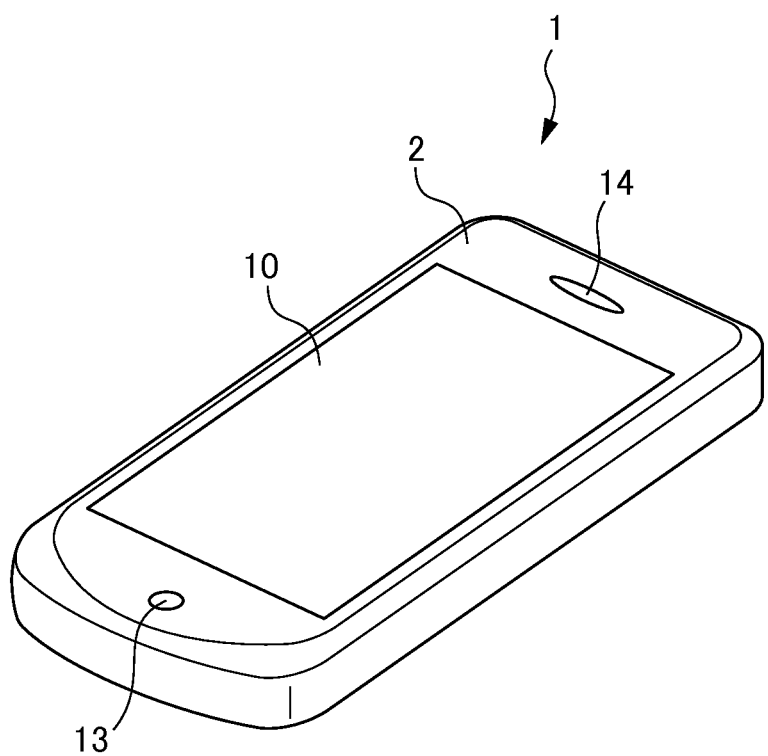
FIG. 1 is a perspective view showing an appearance of a cellular telephone device according to the present embodiment.

Descriptions are provided hereinafter regarding an embodiment of the present invention. First of all, with reference to FIG. 1, descriptions are provided for a basic structure of a cellular telephone device 1 according to an embodiment of the electronic device of the present invention. FIG. 1 is a perspective view showing an appearance of the cellular telephone device 1 according to the present embodiment.

The cellular telephone device 1 includes a body 2. A touch panel 10, a microphone 13 and a speaker 14 are disposed on a front face portion of the body 2.

Figure 2:
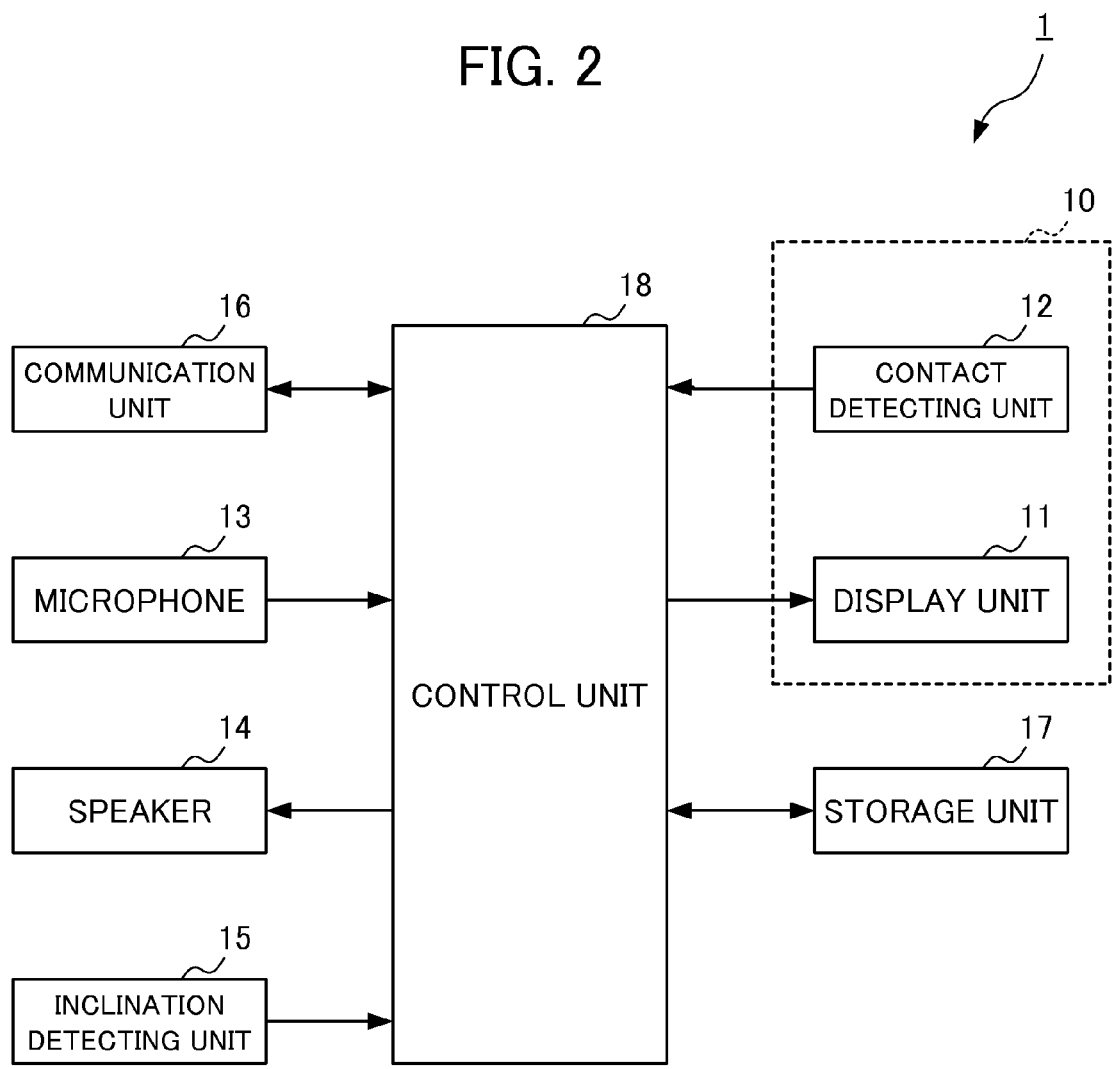
FIG. 2 is a block diagram showing functions of the cellular telephone device according to the present embodiment.

The touch panel 10 includes a display unit 11 and a contact detecting unit 12 (see FIG. 2). The display unit 11 is a liquid-crystal display panel, an organic EL (electroluminescence) display panel, or the like. The contact detecting unit 12 is disposed correspondingly to the display unit 11, and detects contact of an object such as a finger or stylus of a user of the cellular telephone device 1. In response to detecting contact of an object, the contact detecting unit 12 transmits a position of the contact to the control unit 18. For example, a sensor that employs a method such as a capacitive sensing method and a resistive film method can be utilized as the contact detecting unit 12.

The microphone 13 is used for inputting sound produced by the user of the cellular telephone device 1 during a telephone call.

The speaker 14 is used for outputting sound produced by the other party whom the user of the cellular telephone device 1 is talking with.

Next, a functional configuration of the cellular telephone device 1 is described with reference to FIG. 2. FIG. 2 is a block diagram showing the functional configuration of the cellular telephone device 1.

The cellular telephone device 1 includes the touch panel 10 (the display unit 11 and the contact detecting unit 12), the microphone 13, and the speaker 14, as described above. Moreover, the cellular telephone device 1 includes an inclination detecting unit 15, a communication unit 16, a storage unit 17, and a control unit 18.

The inclination detecting unit 15 is configured with a three-axis acceleration sensor and the like to detect an inclination angle of the body 2. In response to detecting an inclination angle of the body 2, the inclination detecting unit 15 transmits the angle to the control unit 18.

The communication unit 16 includes a main antenna (not illustrated) and an RF circuit unit (not illustrated), and performs communication with an external device such as a base station in a predetermined usable frequency band. More specifically, the communication unit 16 executes demodulation processing of a signal received via the main antenna, and transmits the signal thus processed to the control unit 18. In addition, the communication unit 16 executes modulation processing of a signal transmitted from the control unit 18, and transmits the signal to an external device via the main antenna.

The storage unit 17 includes, for example, working memory, and is utilized for arithmetic processing by the control unit 18. Furthermore, the storage unit 17 stores a single or plurality of applications running inside the cellular telephone device 1. It should be noted that the storage unit 17 may also serve as detachable external memory.

The control unit 18 controls the entirety of the cellular telephone device 1. For example, the control unit 18 performs predetermined control of the display unit 11, the speaker 14, and the communication unit 16. Moreover, in response to detecting contact of an object by the contact detecting unit 12, the control unit 18 executes various types of processing. In addition, in response to detecting an inclination angle of the body 2 by the inclination detecting unit 15, the control unit 18 executes various types of processing. Furthermore, when executing such processing, the control unit 18 controls the storage unit 17 to read various programs and data and write data. Moreover, the control unit 18 controls the display unit 11 to display first information and second information.

Here, the first information is character information such as, for example, a function name, a user name registered with an address book, or an email subject.

The second information is subordinate information to the first information, and is character information such as, for example, a supplementary explanation of a function name, or a telephone number and an address corresponding to the user name registered with the address book, or text of an email message.

Detailed descriptions are provided hereinafter regarding processing of display control performed by the control unit 18.

The control unit 18 functions as a mode setting unit, and sets a display mode of the display unit 11 to any one of: a first display mode for performing two-dimensional display; and a second display mode for performing three-dimensional display, in accordance with an inclination angle of the body 2 detected by the inclination detecting unit 15. More specifically, in a case in which the inclination angle of the body 2 detected by the inclination detecting unit 15 is at least a predetermined angle for a certain period of time, the control unit 18 changes the display mode from the first display mode to the second display mode. In addition, in a case in which the inclination angle of the body 2 detected by the inclination detecting unit 15 is less than the predetermined angle for the certain period of time, the control unit 18 changes the display mode from the second display mode to the first display mode.

Here, when an inclination angle of the body 2 is detected by the inclination detecting unit 15 when the first information is displayed in the first display mode, the control unit 18 assumes the inclination angle as a zero degree (reference angle), and performs display control by way of an angle relative to the reference angle.

It should be noted that the control unit 18 may change whether to allow the display mode to be changed in accordance with the inclination angle of the body 2, in response to detecting contact of a predetermined pattern by the detecting unit 12. Furthermore, in this case, the storage unit 17 may store information for controlling whether to allow the display mode to be changed in accordance with the inclination angle of the body 2.

The two-dimensional display refers to displaying character information in a manner that the character information is displayed on a plane. In other words, in a case in which character information is displayed on a first virtual face 11a of a virtual polyhedron, the two-dimensional display is a manner of displaying the first virtual face 11a so as to be viewed from its front.

On the other hand, the three-dimensional display refers to displaying character information in a manner that the character information is displayed on a surface of a three-dimensional object. In other words, in a case in which character information is displayed on the first virtual face 11a of the virtual polyhedron, and another character information is displayed on a second virtual face 11b adjacent to the first virtual face 11a, the three-dimensional display is a manner of displaying the first virtual face 11a and the second virtual face 11b so as to be viewed from a diagonal position.

In other words, by setting the display mode of the display unit 11 to any one of: the first display mode for performing two-dimensional display; and the second display mode for performing three-dimensional display, the control unit 18 can cause the display unit 11 to display the virtual polyhedron, in which the first information is displayed on the first virtual face 11a, and the second information is displayed on the second virtual face 11b adjacent to the first virtual face 11a.

In a case in which the display mode is set to the first display mode, the control unit 18 causes the display unit 11 to display the first information, and in a case in which the display mode is set to the second display mode, the control unit 18 causes the display unit 11 to display the first information and the second information.

More specifically, in a case in which the display mode is set to the first display mode, the control unit 18 causes the display unit 11 to display the first virtual face 11a of the virtual polyhedron in a two-dimensional manner. Moreover, in a case in which the display mode of the display unit 11 is set to the first display mode, the control unit 18 causes the display unit 11 to display the first information as a plurality of items in a list form, such as, for example, a menu that displays a plurality of functions, an address book that displays a plurality of user names registered with the address book, or a list of received email messages.

It should be noted that, although the first information is displayed as a plurality of items in a list form in the present embodiment, it is not limited thereto, and the first information may be displayed as a plurality of items in another form such as, for example, icons.

Figure 3:
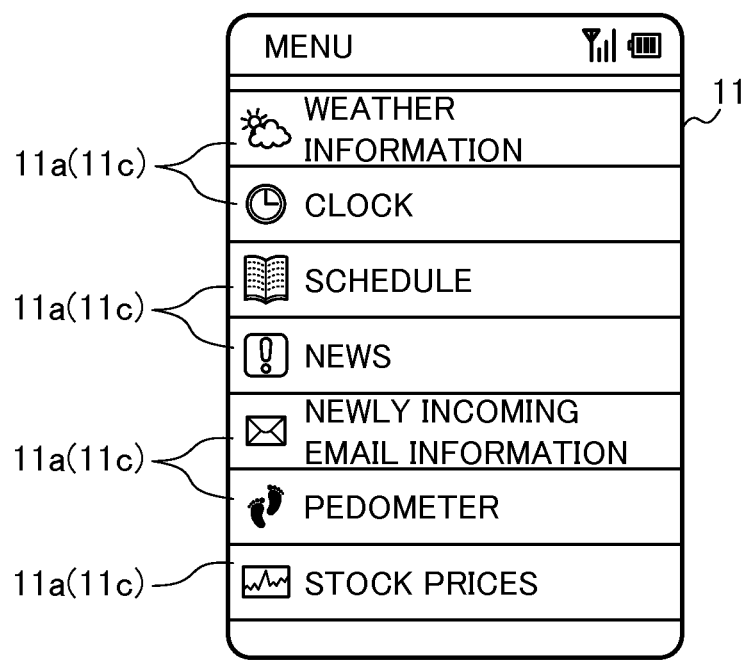
FIG. 3 is a diagram showing an example, in a case in which a display mode of a display unit according to the present embodiment is set to a first display mode, and first virtual faces (third virtual faces) are displayed on the display unit.

FIG. 3 is a diagram showing an example, in a case in which the display mode of the display unit 11 according to the present embodiment is set to the first display mode, and the first virtual faces 11a (third virtual faces 11c) are displayed on the display unit 11. As shown in FIG. 3, in a case in which the display mode of the display unit 11 is set to the first display mode, it is possible to recognize that the first information being displayed on the first virtual faces 11a is displayed in a two-dimensional manner. In addition, as shown in FIG. 3, it is possible to recognize that the first information is displayed as a plurality of items in a list form on the display unit 11.

In a case in which the display mode of the display unit 11 is set to the second display mode, the control unit 18 causes the display unit 11 to display a virtual polyhedron in a three-dimensional manner, in which the first information and the second information are displayed on the first virtual faces 11a and the second virtual faces 11b, respectively. Furthermore, in a case in which the display mode of the display unit 11 is set to the second display mode, the control unit 18 causes the display unit 11 to display the plurality of first virtual faces 11a in a list form, and causes the display unit 11 to display the plurality of second virtual faces 11b that display a plurality of pieces of the second information corresponding to a plurality of pieces of the first information, respectively, the second virtual faces 11b being adjacent to the first virtual faces 11a that display the first information.

Moreover, in a case in which the display mode of the display unit 11 is set to the second display mode, the control unit 18 causes the display unit 11 to display the first virtual faces 11a in an oblique perspective manner in an orientation, and causes the display unit 11 to display the second virtual faces 11b in an oblique perspective manner in an orientation different from the orientation of the first virtual faces 11a. It should be noted that, in the present embodiment, descriptions are provided such that the control unit 18 causes the display unit 11 to display the first virtual faces 11a in a case in which the display mode is set to the second display mode; however, the control unit 18 may cause the display unit 11 to display the first virtual faces 11a and the second virtual faces 11b, at least one of which is displayed obliquely to another, in a case in which the display mode is set to the second display mode.

In addition, in a case in which the display mode is set to the second display mode, the control unit 18 changes a manner of displaying the second information relative to the first information displayed on the display unit 11, in accordance with an inclination angle of the body 2 detected by the inclination detecting unit 15. More specifically, the control unit 18 performs display control such that, as the inclination angle of the body 2 detected by the inclination detecting unit 15 is increased, an area for displaying the first information is decreased, and an area for displaying the second information is increased.

Figure 4A:
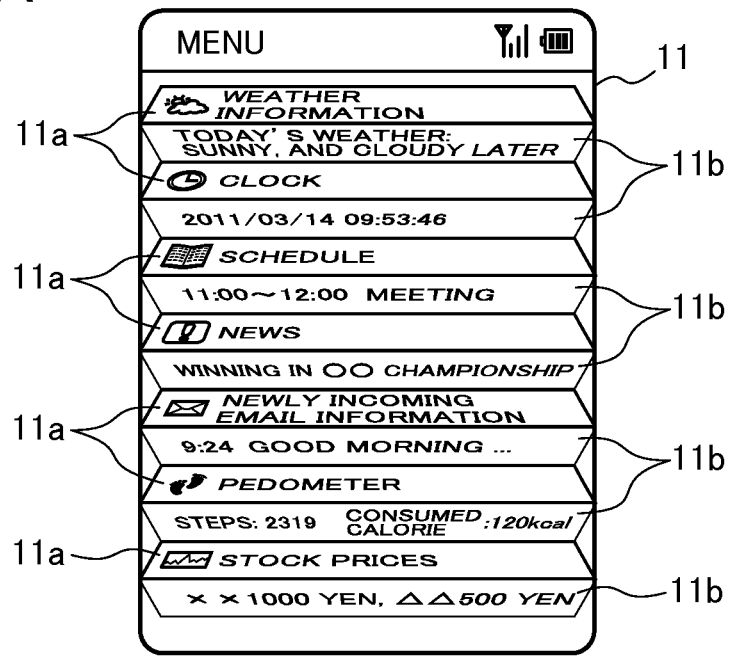
FIG. 4 is a diagram showing an example, in a case in which the display mode of the display unit according to the present embodiment is set to a second display mode, and the first virtual faces and second virtual faces are displayed on the display unit.
Figure 4B:
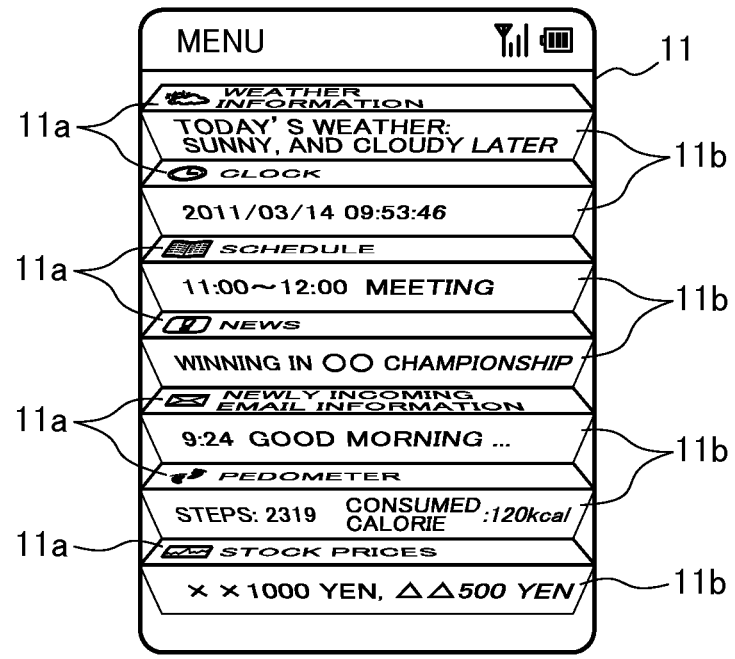

FIG. 4 is a diagram showing an example, in a case in which the display mode of the display unit 11 according to the present embodiment is set to the second display mode, and the first virtual faces 11a and the second virtual faces 11b are displayed on the display unit 11. FIG. 4a is a diagram showing a display manner of the display unit 11, in a case in which an inclination angle of the body 2 detected by the inclination detecting unit 15 is a first angle that is not the reference angle. FIG. 4b is a diagram showing a display manner of the display unit 11, in a case in which an inclination angle of the body 2 detected by the inclination detecting unit 15 is a second angle that is greater than the first angle.

As shown in FIGS. 4a and 4b, in a case in which the display mode of the display unit 11 is set to the second display mode, it is possible to recognize that the first virtual faces 11a and the second virtual faces 11b are displayed in a three-dimensional manner. Furthermore, as shown in FIGS. 4a and 4b, in a case in which the display mode of the display unit 11 is set to the second display mode, it is possible to recognize that the first information is displayed as a plurality of items in a list form, and the second information is displayed as a plurality of items corresponding to and being adjacent to the plurality of items of the first information, respectively, on the display unit 11.

Moreover, it is possible to recognize that the area for displaying the first information in FIG. 4b is smaller than the area for displaying the first information in FIG. 4a, and the area for displaying the second information in FIG. 4b is larger than the area for displaying the second information in FIG. 4a.

It should be noted that, when the display manner is changed, in the display manner described above, the proportion of the areas for displaying the first virtual faces 11a and the second virtual faces 11b is changed; however, the embodiment is not limited thereto. For example, while maintaining the proportion of the areas, the control unit 18 may change virtual orientations of the first virtual faces 11a and the second virtual faces, in accordance with an angle detected by the inclination detecting unit 15.

It should be noted that, in the above description, the control unit 18 performs display control such that character information is displayed on the first virtual faces 11a of the virtual polyhedron, and character information is displayed on the second virtual faces 11b adjacent to the first virtual faces 11a; however, the display control is not limited thereto. For example, the control unit 18 may perform display control based on a virtual display state, in which the first information is displayed on the third virtual faces 11c, and the second information is displayed on fourth virtual faces 11d, the fourth virtual faces 11d being separated from the third virtual faces 11c in a predetermined direction, and being partly or entirely overlapped with the third virtual faces 11c in a predetermined direction, in a virtual space.

In this case, in a case in which the display mode is set to the first display mode, the control unit 18 causes the display unit 11 to display the third virtual faces 11c in a two-dimensional manner, and restricts the fourth virtual faces 11d from being displayed on the display unit 11 by entirely overlapping the third virtual faces 11c with the fourth virtual faces 11d. In this case, the first information is displayed similarly to the display example shown in FIG. 3.

In addition, in a case in which the display mode is set to the second display mode, the control unit 18 causes the display unit 11 to display the third virtual faces 11c and the fourth virtual faces 11d in a three-dimensional and oblique perspective manner in the same orientation. In other words, in a case in which the display mode is set to the second display mode, the control unit 18 causes the display unit 11 to display the third virtual faces 11c and the fourth virtual faces 11d, in a manner of displaying both of the third virtual faces 11c and the fourth virtual faces 11d. More specifically, the control unit 18 causes the display unit 11 to display both of the third virtual faces 11c and the fourth virtual faces 11d, by partly overlapping the third virtual faces 11c with the fourth virtual faces 11d. Furthermore, the control unit 18 causes the display unit 11 to display the first information in an oblique perspective manner in an orientation, and causes the display unit 11 to display the second information in an oblique perspective manner in the same orientation.

Figure 5:
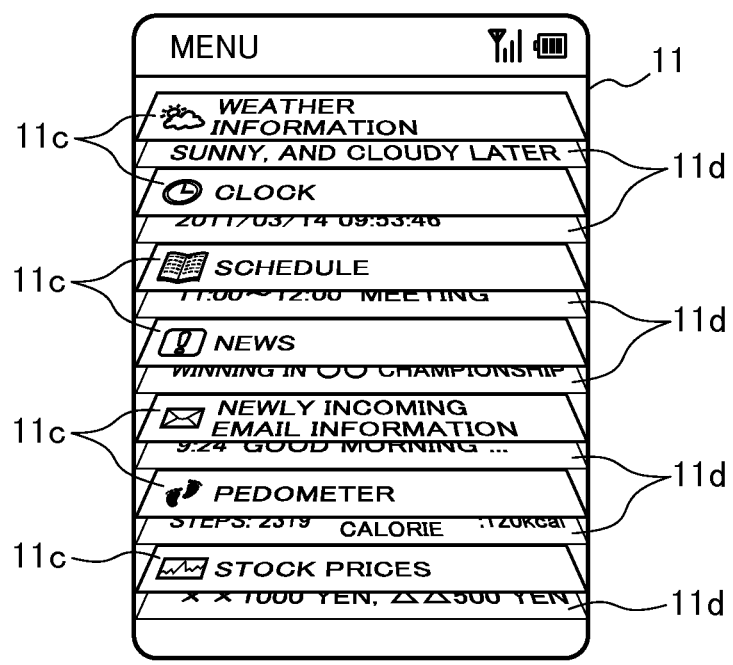
FIG. 5 is a diagram showing an example, in a case in which the display mode of the display unit according to the present embodiment is set to the second display mode, and the third virtual faces and fourth virtual faces are displayed on the display unit.

FIG. 5 is a diagram showing an example, in a case in which the display mode of the display unit 11 according to the present embodiment is set to the second display mode, and the third virtual faces 11c and the fourth virtual faces 11d are displayed on the display unit 11. In FIG. 5, it is possible to recognize that the first information and the second information are displayed in an oblique perspective manner in the same direction, unlike the display example shown in FIG. 4. It should be noted that, in FIG. 5, the fourth virtual faces 11d are displayed in a state where the fourth virtual faces 11d are partly not displayed; however, the control unit 18 may perform display control of reducing the areas of the fourth virtual faces 11d being not displayed, as the inclination angle of the body 2 detected by the inclination detecting unit 15 is increased.

Next, descriptions are provided for a flow of processing by the control unit 18 to display the first information and the second information on the display unit 11.

Figure 6:
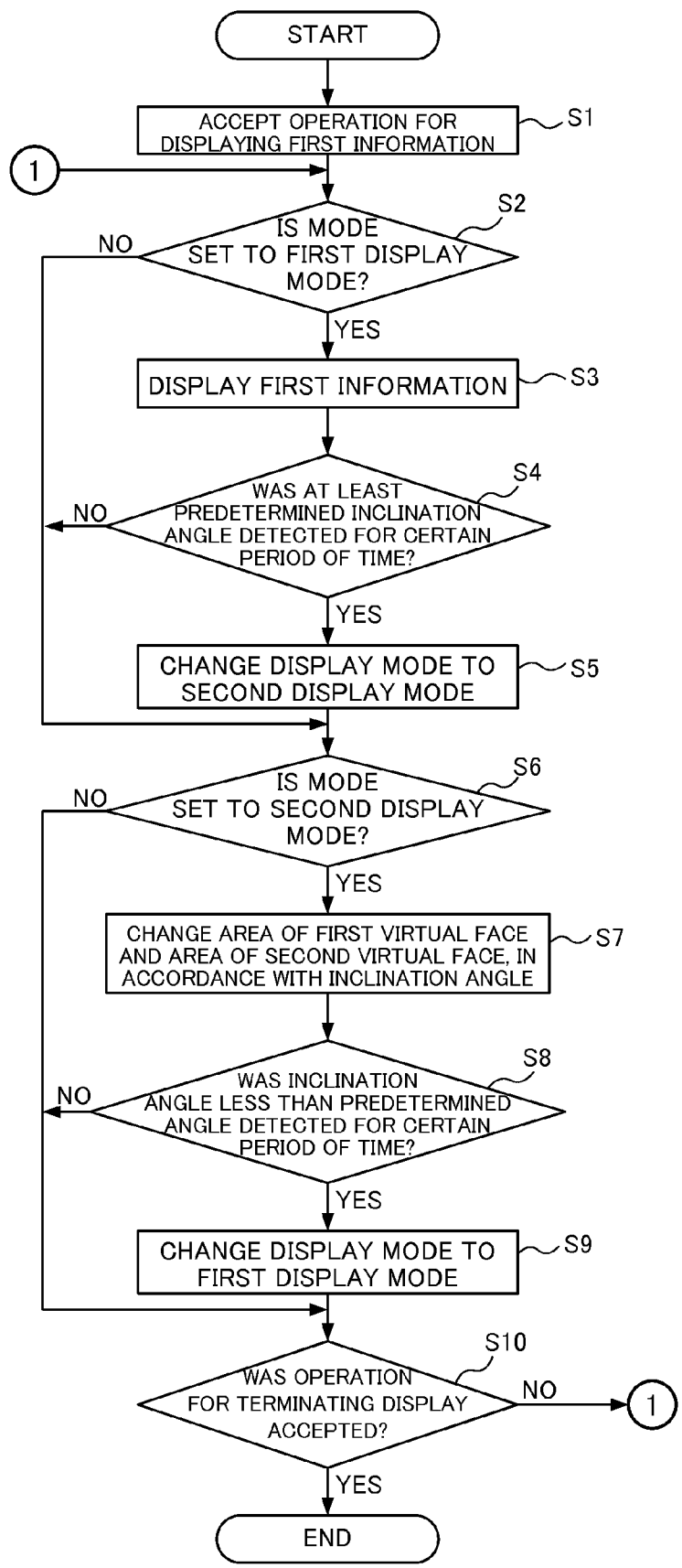
FIG. 6 is a flow chart showing a flow of processing by a control unit according to the present embodiment to display first information and second information on the display unit.

FIG. 6 is a flow chart showing a flow of processing by the control unit 18 according to the present embodiment to display the first information and the second information on the display unit 11. In Step S1, the control unit 18 accepts an operation for displaying the first information, via the contact detecting unit 12.

In Step S2, the control unit 18 determines whether the display mode of the display unit 11 is set to the first display mode. In a case in which the determination is YES, the control unit 18 advances the processing to Step S3, and in a case in which the determination is NO, the control unit 18 advances the processing to Step S6.

In Step S3, the control unit 18 causes the display unit 11 to display the first information in a two-dimensional manner.

In Step 4, the control unit 18 determines whether the inclination angle of the body 2 detected by the inclination detecting unit 15 is at least a predetermined angle for a certain period of time. In a case in which the determination is YES, the control unit 18 advances the processing to Step S5, and in a case in which the determination is NO, the control unit 18 advances the processing to Step S6.

In Step S5, the control unit 18 changes the display mode of the display unit 11 from the first display mode to the second display mode.

In Step S6, the control unit 18 determines whether the display mode of the display unit 11 is set to the second display mode. In a case in which the determination is YES, the control unit 18 advances the processing to Step S7, and in a case in which the determination is NO, the control unit 18 advances the processing to Step S10.

In Step S7, the control unit 18 causes to the display unit 11 to display the first information and the second information in a three-dimensional manner. In addition, in accordance with the inclination angle of the body 2 detected by the inclination detecting unit 15, the control unit 18 changes the proportion of the area for displaying the first information and the area for displaying the second information on the display unit 11.

In Step 8, the control unit 18 determines whether the inclination angle of the body 2 detected by the inclination detecting unit 15 is less than a predetermined angle for a certain period of time. In a case in which the determination is YES, the control unit 18 advances the processing to Step S9, and in a case in which the determination is NO, the control unit 18 advances the processing to Step S10.

In Step S9, the control unit 18 changes the display mode of the display unit 11 from the second display mode to the first display mode.

In Step S10, the control unit 18 determines whether an operation for terminating the display of the first information displayed on the display unit 11 was accepted via the contact detecting unit 12. In a case in which the determination is YES, the control unit 18 terminates the processing in the present flowchart, and in a case in which the determination is NO, the control unit 18 advances the processing to Step S2.

As described above, according to the present embodiment, with the control unit 18, the cellular telephone device 1 sets the display mode of the display unit 11 to any one of: the first display mode for performing two-dimensional display; and the second display mode for performing three-dimensional display. In addition, with the control unit 18, in a case of being set to the second display mode, the cellular telephone device 1 displays both of the first information and the second information, which is subordinate information to the first information, on the display unit 11, and in a case of being set to the first display mode, the cellular telephone device 1 displays any one of the first information and the second information on the display unit 11.

Therefore, since the cellular telephone device 1 can display both of the first information and the second information, which is the subordinate information to the first information, on the display unit 11, the information can be efficiently displayed in a single display area.

Furthermore, in a case of being set to the second display mode, the cellular telephone device 1 displays the second information correspondingly to the first information on the display unit 11; therefore, the user can easily recognize the second information corresponding to the first information.

Moreover, in a case of being set to the first display mode, the cellular telephone device 1 displays the first virtual faces 11a in a two-dimensional manner on the display unit 11, and in a case of being set to the second display mode, the cellular telephone device 1 displays the virtual polyhedron in a three-dimensional manner on the display unit 11, and displays the first information and the second information on the first virtual faces 11a and the second virtual faces 11b, respectively. In addition, in a case of being set to the second display mode, the cellular telephone device 1 displays the first information and the second information, at least one of which is displayed obliquely to another.

Therefore, in a case of being set to the second display mode, the cellular telephone device 1 can display the first information and the second information in a three-dimensional manner.

Furthermore, since the cellular telephone device 1 sets the display mode to any one of the first display mode and the second display mode in accordance with the inclination angle of the body 2 detected by the inclination detecting unit 15, the first display mode or the second display mode can be set through an operation that is intuitive for the user.

Moreover, in a case of being set to the second display mode, the cellular telephone device 1 changes the manner of displaying the second information relative to the first information displayed on the display unit 11, in accordance with the inclination angle detected by the inclination detecting unit 15; therefore, the user can perform an operation with a feeling as if tilting a three-dimensional object displayed on the display unit 11.

In addition, in a case in which the third virtual faces 11c and the fourth virtual faces 11d are displayed, the third virtual faces 11c displaying the first information and being overlapped with a part or all of the fourth virtual faces 11d, and the display mode is set to the first display mode, the cellular telephone device 1 displays the third virtual faces 11c, and restricts the fourth virtual faces 11d from being displayed, by entirely overlapping the third virtual faces 11c with the fourth virtual faces 11d.

Therefore, in a case of being set to the second display mode, the cellular telephone device 1 can display the second information in a three-dimensional manner, with a feeling as if looking into the fourth virtual faces 11d disposed under the third virtual faces 11c.

Furthermore, in a case of being set to the first display mode, the cellular telephone device 1 displays the plurality of pieces of the first information on the display unit 11, and in a case of being set to the second display mode, the cellular telephone device 1 displays the second information corresponding to the first information so as to be adjacent to the first information on the display unit 11. Therefore, the cellular telephone device 1 can efficiently display the first information and the second information, such that the plurality of pieces of the first information correspond to the plurality of pieces of the second information, respectively.

Although an embodiment of the present invention has been described above, the present invention is not limited to the aforementioned embodiment. Moreover, the effects described in the embodiment of the present invention merely exemplify the most preferable effects arising from the present invention, and the effects according to the present invention are not limited to those described in the embodiment of the present invention.

For example, in a case of being set to the first display mode, the description has been provided for the display manner with reference to FIG. 3, in which only the first virtual faces 11a (the third virtual faces 11c) are displayed on the display unit 11; however, the display manner is not limited thereto, and only the second virtual faces 11b (the fourth virtual faces 11d) may be displayed on the display unit 11.

Although the present invention has been described for the cellular telephone device 1 including the touch panel 10, the present invention may be applied to a cellular telephone device without the touch panel 10. The cellular telephone device may be of: a straight type; a folder type in which two bodies are connected via a hinge; a slider type in which one of the bodies slides to one direction in a state in which the bodies are mutually superimposed; or a rotating (turning) type in which one of the bodies is rotated around an axis line along the direction of superimposing the bodies.

In addition, although the aforementioned embodiment has been described by illustrating the cases in which the present invention is applied to the cellular telephone device 1, the present invention is not limited thereto. The present invention can also be applied to an electronic device such as a PHS (Personal Handyphone System), a PDA (Personal Digital Assistant) or a portable gaming machine.

What is claimed is:

1. An electronic device, comprising:
   a display unit that displays a first face for displaying first information, and a second face for displaying second information, which is subordinate information to the first information;
   a mode setting unit that sets a display mode of the display unit to any one of:
      a first display mode for displaying the first face or the second face in a two-dimensional manner; and
      a second display mode for displaying the first face and the second face in a three-dimensional manner; and
   a control unit that controls display of the display unit, based on the setting by the mode setting unit,
   wherein, in a case of being set to the first display mode, the control unit causes the display unit to display any one face of the first face and the second face in a two-dimensional manner, and causes the one face to be entirely overlapped with an other face of the first face and the second face, thereby restricting the other face from being displayed, and
   wherein, in a case of being set to the second display mode, the control unit causes the display unit to display the one face and the other face, which is partly overlapped with the one face in an oblique perspective manner in a same orientation, thereby causing the display unit to display both of the one face and the other face in a three-dimensional manner.

2. The electronic device according to claim 1, further comprising:
a body including the display unit; and
an inclination detecting unit that detects inclination of the body,
wherein, in a case of being set to the second display mode, the control unit can perform display control of reducing overlapped areas of the one face and the other face, in accordance with an angle of the inclination detected by the inclination detecting unit.

3. The electronic device according to claim 2,
wherein the control unit performs the display control, in accordance with an angle relative to the angle of the inclination when both of the one face and the other face are displayed in the second display mode.

4. The electronic device according to claim 3,
wherein, in a case of being set to the second display mode, the control unit can perform display control of reducing the overlapped areas, as the angle of the inclination is increased in relation to the angle of the inclination when both of the one face and the other face are displayed in the second display mode.

5. The electronic device according to claim 1, further comprising:
a body including the display unit; and
an inclination detecting unit that detects inclination of the body,
wherein, in a case of being set to the first display mode, the control unit does not change a display function of the one face, in accordance with an angle of the inclination detected by the inclination detecting unit, and
wherein, in a case of being set to the second display mode, the control unit can perform display control of reducing overlapped areas of the one face and the other face, in accordance with an angle of the inclination detected by the inclination detecting unit.

6. A display control method for an electronic device including a display unit to display information on the display unit,
wherein the display unit displays a first face for displaying first information, and a second face for displaying second information, which is subordinate information to the first information,
wherein the electronic device can set a display mode of the display unit to any one of a first display mode for displaying the first face or the second face in a two-dimensional manner, and a second display mode for displaying the first face and the second face in a three-dimensional manner, and
wherein the display control method comprises:
in a case of being set to the first display mode, causing the display unit to display any one face of the first face and the second face in a two-dimensional manner, and causing the one face to be entirely overlapped with an other face of the first face and the second face, thereby restricting the other face from being displayed; and
in a case of being set to the second display mode, causing the display unit to display the one face and the other face, which is partly overlapped with the one face in an oblique perspective manner in a same orientation, thereby causing the display unit to display both of the one face and the other face in a three-dimensional manner.

7. The display control method according to claim 6,
wherein the electronic device further comprises: a body including the display unit; and an inclination detecting unit that detects inclination of the body, and
wherein the display control method further comprises:
in a case of being set to the second display mode, allowing display control to reduce overlapped areas of the one face and the other face, in accordance with an angle of the inclination detected by the inclination detecting unit.

8. The display control method according to claim 7,
wherein the display control method further comprises:
performing the display control, in accordance with an angle relative to the angle of the inclination when both of the one face and the other face are displayed in the second display mode.

9. The display control method according to claim 8,
wherein the display control method further comprises:
in a case of being set to the second display mode, allowing display control to reduce the overlapped areas, as the angle of the inclination is increased in relation to the angle of the inclination when both of the one face and the other face are displayed in the second display mode.

10. The display control method according to claim 6,
wherein the electronic device further comprises:
a body including the display unit; and
an inclination detecting unit that detects inclination of the body, and wherein the display control method further comprises:
in a case of being set to the first display mode, not changing a display function of the one face, in accordance with an angle of the inclination detected by the inclination detecting unit; and
in a case of being set to the second display mode, allowing display control to reduce overlapped areas of the one face and the other face, in accordance with an angle of the inclination detected by the inclination detecting unit.

11. A non-transitory storage medium storing thereon a display control program for causing an electronic device including a display unit to execute operations for displaying information on the display unit:
wherein the display unit displays a first face for displaying first information, and a second face for displaying second information, which is subordinate information to the first information, and
wherein the display control program causes the electronic device to execute operations comprising:
setting a display mode of the display unit to any one of: a first display mode for displaying the first face or the second face in a two-dimensional manner; and a second display mode for displaying the first face and the second face in a three-dimensional manner;
in a case of being set to the first display mode, causing the display unit to display any one face of the first face and the second face in a two-dimensional manner, and causing the one face to be entirely overlapped with an other face of the first face and the second face, thereby restricting the other face from being displayed; and
in a case of being set to the second display mode, causing the display unit to display the one face and the other face, which is partly overlapped with the one face in an oblique perspective manner in a same orientation, thereby causing the display unit to display both of the one face and the other face in a three-dimensional manner.

12. The non-transitory storage medium according to claim 11, wherein the electronic device further comprises:
a body including the display unit; and
an inclination detecting unit that detects inclination of the body, and
wherein the display control program causes the electronic device to execute operations comprising:
in a case of being set to the second display mode, allowing display control to reduce overlapped areas of the one face and the other face, in accordance with an angle of the inclination detected by the inclination detecting unit.

13. The non-transitory storage medium according to claim 12, wherein the display control program causes the electronic device to execute operations comprising:
performing the display control, in accordance with an angle relative to the angle of the inclination when both of the one face and the other face are displayed in the second display mode.

14. The non-transitory storage medium according to claim 13, wherein the display control program causes the electronic device to execute operations comprising:
in a case of being set to the second display mode, allowing display control to reduce the overlapped areas, as the angle of the inclination is increased in relation to the angle of the inclination when both of the one face and the other face are displayed in the second display mode.

15. The non-transitory storage medium according to claim 11, wherein the electronic device further comprises:
a body including the display unit; and an inclination detecting unit that detects inclination of the body,
wherein the display control program causes the electronic device to execute operations comprising:
in a case of being set to the first display mode, not changing a display function of the one face, in accordance with an angle of the inclination detected by the inclination detecting unit; and
in a case of being set to the second display mode, allowing display control to reduce overlapped areas of the one face and the other face, in accordance with an angle of the inclination detected by the inclination detecting unit.

* * * * *